Figure 1:
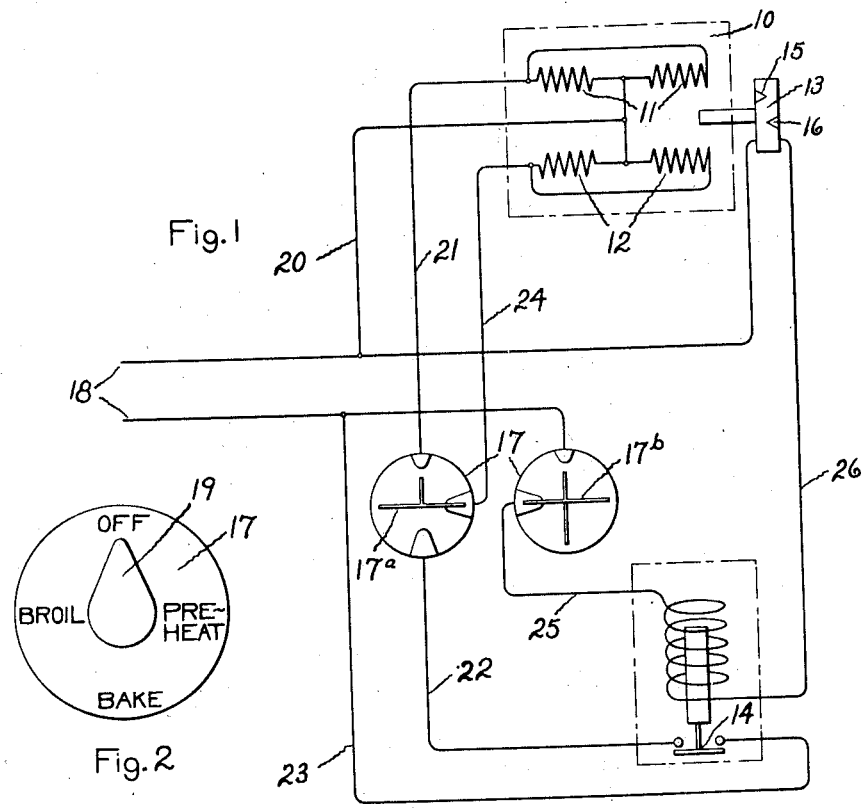

Oct. 13, 1931.  G. W. HEINBUCH  1,827,656
ELECTRIC OVEN
Filed Nov. 22, 1928

Inventor:
George W. Heinbuch,
by Charles E. Tullar
His Attorney.

Patented Oct. 13, 1931

1,827,656

UNITED STATES PATENT OFFICE

GEORGE W. HEINBUCH, OF TORONTO, ONTARIO, CANADA, ASSIGNOR TO GENERAL ELECTRIC COMPANY, A CORPORATION OF NEW YORK

ELECTRIC OVEN

Application filed November 22, 1928, Serial No. 321,215, and in Canada December 23, 1927.

My invention relates to electric ovens and the like, more particularly to control systems therefor and has for its object the provision of such a control system which is of a simple and reliable construction and which is convenient and efficient in operation.

Although it obviously has other applications, my invention is particularly useful in the control of electric baking and broiling ovens of the type provided with a plurality of heating units.

It has been customary heretofore in the construction of some types of electric ovens to provide a heating unit in the top of the oven and another in the bottom of the oven, these units each being divided into sections which are each controlled by means of a suitable switch so that the sections of each unit may be connected in series or in parallel to give different rates of heat generation. This method of oven control, however, in addition to being of rather expensive construction, leaves something to be desired in the way of convenience in operation. In one of its aspects, therefore, my invention contemplates the provision of a system of control whereby an oven, provided with a plurality of heating units, will be placed under the control of a single switch.

It has also been customary to provide a thermostatic switch responsive to the oven temperature for controlling the heating circuits of the oven so as to open these circuits upon the oven attaining a predetermined temperature. This thermostatic switch, which is usually inserted in the oven supply circuit, effects the control of the energizing circuits for the heating units through the medium of some suitable circuit controlling means, as for instance, a contactor included in the energizing circuits. Thus, the energizing circuit for this contactor is placed under the control of the thermostatic switch so that when the switch is in its off or zero position, the heating circuits will be interrupted. Some difficulty has been experienced with arrangements of this type in that oftentimes the operator would neglect to return the thermostatic switch to its zero position at the proper times with the result that the contactor energizing circuit would remain completed regardless of whether the oven was being used or not. Thus, not only would current be needlessly consumed for considerable periods of time, but also the operating coil of the contactor would become impaired. Another aspect of my invention, therefore, is a provision of a control system for the oven whereby when the single control switch is returned to its off or neutral position the energizing circuit for the heating circuit controlling means, as for instance the contactor referred to above, will be interrupted irrespective of the operation of the thermostatc switch. This is of distinct advantage in that when the control switch for the various oven units has been turned to the off position, the operation will be assured by glancing at the switch panel that no current is flowing and thus it becomes unnecessary to return the thermostatic switch to its off position.

In carrying my invention into effect in one form thereof, I provide a single switch for controlling the heating units of the oven. This switch is so connected that the heating units will be electrically interconnected with each other and with a suitable source of electrical supply with the switch in one position and, furthermore, each unit will be connected to the source of supply independently of each of the other units by operation of the switch to a corresponding controlling position. Moreover, I so control the heating circuits by the single switch that the circuits will be opened when the switch is moved to its neutral position irrespective of the operation of the thermostatic control means.

Figures 3, 4:
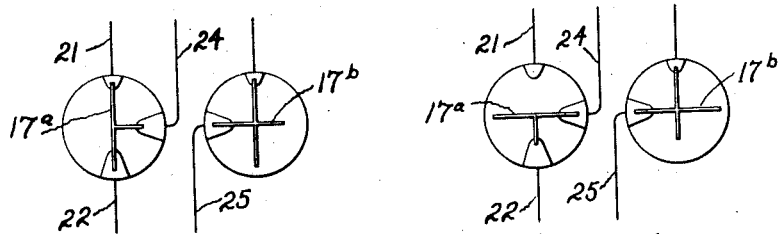
Figure 5:
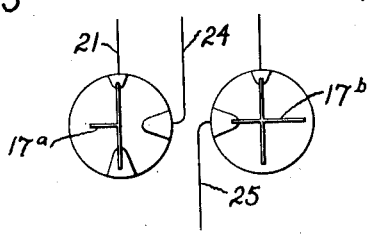

For a more complete understanding of my invention, reference should be had to the accompanying drawings in which Fig. 1 is a diagrammatic view of an electric oven provided with a system of control in accordance with my invention; Fig. 2 is a view of the control switch; and Figs. 3, 4 and 5 are diagrammatic views of the switch showing various electric connections for the heating units with the switch in different operative positions.

Referring to the drawings, I have shown my invention in one form in connection with an electric baking and broiling oven provided with a plurality of heating units and a thermostatic switch control. As shown, the oven 10, which may be of any desired form and size, is provided with two heating units 11 and 12. The heating unit 11 is located within the upper portion of the oven while the heating unit 12 is located within the lower portion of the oven. These units may be and preferably are of the well known resistor type. The oven is further provided with a suitable thermostatic switch 13 which is provided to open the oven heating circuits responsively to a predetermined oven temperature. This switch 13 operates to open these heating circuits through the medium of any suitable circuit controlling means, as for instance the contactor 14, which, as shown, is connected in the oven heating circuits. It will be readily understood, however, that any circuit controlling means which may be operated responsively to the action of the thermostatic switch 13 may be provided.

The thermostatic switch 13 is illustrated as of the type provided with two movable indicators 15 and 16, one of which may be set arbitrarily and the other of which is moved by means of a thermostatic element which is under the influence of the oven temperature. When these two indicators are opposite one another indicating that the temperature is that for which the indicator was set, the circuit will be broken. It is believed unnecessary for a proper understanding of this invention to illustrate in detail the construction of this thermostat since any thermostat of well known construction may be employed.

In order to conveniently and economically control the heating units 11 and 12 and further to insure that the heating circuits will be opened and all control circuits of the system be deenergized at the proper times irrespective of the operation of the thermostatic switch 13, I insert a single operating switch 17 in the energizing circuits leading from any suitable source of electrical supply, as for instance, that designated by the ordinal 18. As shown, the switch 17 is provided with two sets of contacts 17—a and 17—b, operated by the single control arm or knob 19, these sets of contacts preferably being placed in superimposed position. As shown, the set of contacts 17—a is provided to control the energizing circuits for both of the heating units 11 and 12 of the oven while the set 17—b is provided to control the heating circuit controlling means 14 which is normally under the control of the thermostatic switch 13.

Referring to the drawing, it will be noted that both of the heating units 11 and 12 are interconnected with the upper conductor of the supply source 18 by means of the conductor 20. Also that the heating unit 11 will be connected with the lower conductor of the supply source 18 by means of the conductor 21, the switching portion 17—a, the conductor 22, the circuit controlling contactor 14 and the conductor 23. Moreover, that the heating unit 12 will be connected with the lower conductor of the supply source 18 by means of the conductor 24, the switching portion 17—a, the conductor 22, the contactor 14 and the conductor 23. As shown, the operating coil of the contactor 14 will be electrically interconnected with the lower conductor of the supply source 18 by means of the conductor 25 and the switching portion 17—b and with the upper conductor of the supply source by means of the conductor 26 and the thermostatic switch mechanism 13. Thus, it will be observed that the operating coil of the contactor 14 will be under the control of both the thermostatic switch 13 and the controlling switch 17. It will also be observed that as long as the operating coil of the contactor 14 is deenergized that it will be impossible to complete the energizing circuits for the oven heating units.

As illustrated in Fig. 1 when the knob 19 is in its off position, the circuits to both of the oven heating units 11 and 12 will be broken at the switch 17—a and will also be broken at the contactor 14 by reason of the fact that its energizing circuit will be broken at the switch 17—b.

When it is desired to preheat the oven, the switch knob 19 will be turned to the "preheat" position so that energizing circuits will be completed through both of the switch portions 17—a and 17—b as indicated in Fig. 3. As will be observed, the energizing circuit for the operating coil of the contactor 14 will be completed from the lower conductor of the supply source 18, through the closed switch portion 17—b, the conductor 25, the operating coil of the contactor 14, the conductor 26, and thence through the thermostatic switch 13 to the upper conductor of the supply source. The contactor 14 will be energized to close and the heating circuits for the oven will be completed through the switch portion 17a and the contactor 14. Thus, by referring to Figs. 1 and 3, it will be observed that these circuits may be traced from the lower conductor of the supply source 18 through the conductor 23, the closed contactor 14, the conductor 22, the switching portion 17—a, through the conductors 21 and 24 to the heating units 11 and 12, through the heating units 11 and 12, connected in parallel, and thence back to the upper conductor of the supply source 18 through the conductor 20.

Thus, since both of the heating units will be energized in parallel relation, the oven will be heated rapidly. When the temperature has reached the desired degree, the knob 19 may be turned to the "bake" position. In this position the controlling circuits will be completed as shown in Fig. 4. Thus, by referring to Figs. 1 and 4 it will be observed that the circuit through the contactor coil 14 will remain energized as before and in consequence the contactor 14 will remain closed. The energizing circuit for the upper heating unit 11, however, will be interrupted at the switch portion 17—a so that this unit will be deenergized. The heating unit 12, however, will remain energized in that an energizing circuit will be completed from the lower conductor of the supply source 18, through the contactor 14, the switch portion 17—a, the conductor 24, the heating unit 12, and thence through the conductor 20 to the upper conductor of the supply source 18. The oven will be maintained at the temperature determined by the setting of the thermostatic switch 13.

By turning the knob 19 to the "broil position", the circuits will be completed, as shown in the Fig. 5. In this position of the switch, the circuit through the operating coil of the contactor 14 will remain energized to maintain the switch 14 closed, while the circuit for the lower heating unit 12 will be broken at the switch 17—a. The heating circuit for the upper unit 11, however, will be completed from the lower conductor supply source 18 through the contactor 14, the switch portion 17—a, the conductor 21, and thence through the heating unit 11 to the upper conductor of the supply source 18. As before, the thermostatic switch 13 will maintain the temperature at a predetermined degree.

When the knob 19 is turned to the "off" position, as indicated in Fig. 1, the circuits through both of the heating units and also through the circuit of the operating coil 14 will be interrupted. As the oven cools down the thermostatic switch 13 will close its associated switching contacts but this is immaterial since the switch 17 has already operated to interrupt the contactor energizing circuit.

It will be understood that the heating units 11 and 12 may have any desired relative capacities so that various desired heating rates may be obtained.

Thus, I provide an automatic oven heating system requiring only a single manually operable switch, different positions of which give different heating rates in the oven and in which the contactor coil will be out of circuit when the switch is at its off position irrespective of whether the thermostatic control has been turned to its zero position or not.

While I have described my invention as embodied in concrete form and operating in a specific manner in accordance with the provisions of the Patent Statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is,—

1. An oven heating system comprising an oven having a plurality of electrical heating units, a thermostatic control mechanism responsive to the temperature of said oven, a control circuit for said heating units including said thermostatic mechanism so that said thermostatic mechanism operates to control said heating units so as to maintain preselected oven temperatures and switching mechanism for controlling said heating units to provide a plurality of heating rates and for deenergizing said heating units, said control circuit being controlled by said switching mechanism so that when said switching mechanism is operated to effect a deenergization of said heating units, said control circuit is opened irrespective of the operation of said thermostatic mechanism.

2. An oven heating system or the like comprising an oven having a pair of heating units, a source of electrical supply for said units, a switching means for controlling said units so as to give different rates of heating with said switching means in different operative positions, an electromagnetic contactor having an armature and an operating coil therefor, the armature completing the circuit to the heating units when the coil is energized, a circuit including the contactor coil under the control of said switching means whereby when the switching means is at the off position the circuit through the coil is broken and whereby when the switching means is at any of its heating positions the circuit through the coil is closed.

3. An oven heating system or the like comprising an oven having upper and lower heating units, a source of electrical supply for said units, switching means for said units, circuits under the control of said switching means whereby with the switching means in different positions said heating units are connected to the supply circuit to give different rates of heating, a thermostatically operated switch under the influence of the oven temperature, an electromagnetic contactor having an armature and an operating coil therefor, the armature completing the circuit to the heating units at one point when the coil is energized, a circuit including the thermostatically operated switch and the contactor coil and under the control of said switching means whereby when said switching means is at the off position the contactor coil circuit is broken and whereby when the switching means is at any of the heating positions the contactor coil circuit is closed.

4. An oven heating system or the like comprising an oven having a pair of heating units, a supply circuit therefor, a single control switch in the supply circuit having a plurality of contacts whereby said pair of heating units are selectively connected to the supply circuit to give different rates of heating, an electromagnetic contactor having an armature and an operating coil therefor, the armature being operative to complete the circuit to the heating units when the coil is energized, a circuit including the contactor coil under the control of said control switch whereby when the control switch is at off position the circuit through the coil is broken and whereby when the control switch is at any of its heating positions the circuit through the coil is closed.

5. An oven heating system or the like comprising an oven having a pair of heating units, a supply circuit therefor, a single control switch in the supply circuit having a plurality of contacts whereby said pair of heating units are selectively connected to the supply circuit to give different rates of heating, a thermostatically operated switch under the influence of the oven temperature, an electromagnetic contactor having an armature and an operating coil therefor, the armature being operative to complete the circuit to said heating units at one point when the coil is energized, a circuit including the thermostatically operated switch and the contactor coil and under the control of said control switch whereby when said control switch is at the off position the contactor coil circuit is broken and whereby when the control switch is at any of its heating positions the contactor coil circuit is closed.

In witness whereof, I have hereunto set my hand this 20th day of November, 1928.

GEORGE W. HEINBUCH.